United States Patent [19]

Tucci

[11] Patent Number: 5,787,236

[45] Date of Patent: Jul. 28, 1998

[54] GRAPHICAL COMPUTER METHOD FOR ANALYZING QUANTUM SYSTEMS

[76] Inventor: Robert R. Tucci, P.O. Box 226, Bedford, Mass. 01730

[21] Appl. No.: 584,168

[22] Filed: Jan. 11, 1996

[51] Int. Cl.$^6$ .................................................. G06F 15/18
[52] U.S. Cl. ................................................................ 395/61
[58] Field of Search ........................................ 395/61, 10

[56] References Cited

U.S. PATENT DOCUMENTS 5,133,046  7/1992  Kaplan ..................................... 395/61

OTHER PUBLICATIONS

D. Deutsch. "Quantum Computational Networks," Proc. Royal Society of London, pp. 73–90, Dec. 1989.

B. Yurke and J.S. Denker, "Quantum network theory," Physical Review, pp. 1419–1437, Dec. 1984.

P. Dagum and R.M. Chavez, "Approximating Probabilistic Inference in Bayesian Belief Networks," IEEE Trans. on Pattern Analysis and Machine Intelligence, vol. 15(3), pp. 246–255, Mar. 1993.

K.G. Olesen, "Causal Probabilistic Networks with Both Discrete and Continuous Variables," IEEE Trans. on Pattern Analysis and Machine Intelligence, vol. 15(3), pp. 275–279 Mar. 1993.

R.R. Tucci, "Quantum Bayesian Nets," Int'l. J. Modern Physics, vol. 9, pp. 295–337, Jan. 1995.

A Kornfeld, "Causal Diagrams: Clarifying Uncertainty," AI Expert, pp. 42–49, Nov. 1991.

E. Charniak. "Bayesian Networks with Tears," AI Magazine. pp. 50–63, Nov. 1991.

M. Henrion, et al., "Decision Analysis and Expert Systems," AI Magazine, pp.64–91, Nov. 1991.

Noetic Systems Inc., "Ergo, Product Information," Jun. 1992.

S.K. Andersen, et al., "Hugin—a Shell for Building Bayesian Belief Universes for Expert Systems," Proc. Eleventh Int'l. Joint Conf. on Artificial Intelligence, vol. 2, pp. 1080–1085, Aug. 1989.

*Primary Examiner*—Robert W. Downs

[57] ABSTRACT

We propose a computer method for analyzing physical systems that exhibit quantum mechanical behavior. To analyze a quantum system according to the method of the present invention, one performs the following steps: First, one enters into the computer some information about the physical system by portraying it on the computer screen as a special type of graph (diagram). Next one enters into the computer additional information that is not contained in the graph. Part of this non-graph information is a matrix of complex numbers for each node of the graph. Finally, the computer uses the entered information to do calculations and it outputs the result of these calculations. The computer output consists mainly of conditional probabilities for the outcomes of measurements performed on the quantum system. The method that we are proposing is similar to the method used in the field of Classical Bayesian Nets (also known as Causal Probabilistic Nets). However, the method of Classical Bayesian Nets does not describe quantum systems correctly, whereas our method does.

21 Claims, 10 Drawing Sheets

*Figure 5*

| | Prior Info | |
|---|---|---|
| Node Name: | $\underline{x}_4$  (71)  | (72) First   (73) Next |
| Degeneracy: | 2  (74) | |

States of Incoming Arrows (75 Node, 76 State)

| Node | State | |
|---|---|---|
| $\underline{x}_3$ | si | (77) First |
| $\underline{x}_2$ | si | (78) Next |

Node Amplitudes (79)

| Is it Active? | State (80) | Re. Part (81) | Im. Part (82) |
|---|---|---|---|
| ● | no | 0.5000 | -0.5000 |
| ● | si | 0.7071 | 0.0000 |

Probability = 1.000  (83)

*Figure 10*

$$\zeta_L = \{(x.)_{T_L} \in (Q.)_{T_L} \mid \prod_{j \in T_L} A_j \neq 0\}$$

$$\zeta_{L-1} = \{(x.)_{T_{L-1}} \in (Q.)_{T_{L-1}} \mid \prod_{j \in T_{L-1} \cup T_L} A_j \neq 0\}$$

$$\zeta_{L-2} = \{(x.)_{T_{L-2}} \in (Q.)_{T_{L-2}} \mid \prod_{j \in T_{L-2} \cup T_{L-1} \cup T_L} A_j \neq 0\}$$

$$\zeta_1 = \{(x.)_{T_1} \in (Q.)_{T_1} \mid \prod_{j \in Z_M} A_j \neq 0\}$$

GRAPHICAL COMPUTER METHOD FOR ANALYZING QUANTUM SYSTEMS

TECHNICAL FIELD

The invention relates to computer programs that display and process information about physical systems that exhibit quantum mechanical behavior.

BACKGROUND OF THE INVENTION

Classical Bayesian (CB) nets are a type of net that is used to model physical situations that include randomness. CB nets allow one to calculate the probabilities of various hypotheses about a situation, taking the available evidence into consideration. They provide an intuitive, graphical framework for doing such calculations. The artificial intelligence and expert systems literature contains a large number of journal articles discussing the theory and application of CB nets. For a detailed summary of the subject of CB nets, the reader may consult the following two textbooks, which are dedicated exclusively to this subject: *Probabilistic Reasoning in Expert Systems: Theory and Algorithms* (Wiley, 1990) by Richard E. Neapolitan, and *Probabilistic Reasoning in Intelligent Systems: Networks of Plausible Inference* (Morgan Kaufman, Palo Alto. 1988), by Judea Pearl. For a short introductory article on the subject of CB nets, the reader may consult, for example, the article by Ari Kornfeld in *AI Expert*, November, 1991. pg. 42. Several software packages that implement the theory of CB nets are commercially available; for example, ERGO [produced by: Noetic Systems, Inc., 2504 Maryland Ave., Baltimore, Md. 21218-4545. Phone: 410-889-4079, FAX: 410-889-4183, Email: info@noeticsystems.com.] and MUNIN [produced by: Hugin Expert A/S Niels Jernes Vej 10, Box 8201, DK-9220 Aalborg, DENMARK. Phone: +45 15 66 44, FAX: +45 15 85 50, Email: info@hugin.dk]

Quantum Bayesian (QB) nets are a new type of Bayesian net. QB nets were first discussed publicly in the journal article: *International Journal of Modern Physics B*. Vol. 9, Jan. 30, 1995 pp. 295–337, by Robert R. Tucci. The latter article will be referred to henceforth as Ref-Tucci-95. Like CB nets, QB nets are used to model certain physical situations. QB nets allow one to calculate the probabilities of various hypotheses about a situation, taking the available evidence into consideration. They provide an intuitive, graphical framework for doing such calculations.

Although CB and QB nets are similar in many ways, there are some fundamental differences between the two. One major difference is that CB nets cannot be used to analyze quantum systems correctly whereas QB nets can be. (By a quantum system we mean a physical system that exhibits quantum mechanical behavior). Another major difference between CB and QB nets is that for QB nets, one assigns complex rather than real numbers to each node of the net.

In U.S. Pat. No. 5,133,046, Stanley Kaplan presents a "computer-based diagnostic expert system organized according to Bayesian Theory". CB nets and QB nets can also be described this way. However, like CB nets, the invention of Stanley Kaplan cannot be used to analyze quantum systems correctly. It assigns real numbers, probabilities, to the states listed in its knowledge base. To describe quantum systems correctly, it would have to assign complex numbers to these states.

QB nets are certainly not the first nets ever proposed for Quantum Mechanics. However, QB nets differ substantially from all other nets previously proposed.

A famous example of a type of net used in Quantum Mechanics is the "Feynman Diagrams" of Particle and Solid State Physics. For a simple discussion of Feynman Diagrams, see, for example, QED: *The Strange Theory Of Light and Matter* (Princeton University Press, Princeton, N.J., 1985), by Richard P. Feynman. Some major differences between Feynman diagrams and QB nets are as follows.

In QB nets, each arrow leaving a node carries full information about the state of its source node (by its source node we mean the node it is exiting), while in Feynman diagrams, when several arrows leave a node, each arrow carries only partial information about the state of its source node.

In using QB nets, we attribute unit probability to the collection of the finitely many possible configurations (net stories) that a single graph can assume. On the other hand, when using Feynman diagrams, we attribute unit probability to a collection of infinitely many different graphs. Indeed, a single Feynman diagram with at least one node represents a small term in a pertubative expansion in powers of some coupling constant. There is nothing intrinsically pertubative about QB nets.

Another type of net which has been proposed for describing Quantum Mechanics are called quantum circuits. See, for example, the paper by D. Deutsch in *Proceedings of the Royal Society Of London*, A425(1989)73–90, or the paper bay B. Yurke and J. S. Denker in *Physical Review* A29 (1984)1419–1437. Like QB nets, quantum circuits are not intrinsically pertubative. Unlike QB nets, when several arrows exit a node of a quantum circuit, each arrow carries along partial information about the state of its source node.

The method of QB nets finds its physical justification in the laws of Quantum Mechanics. The method of QB nets does not embody any new physical laws. Rather, QB nets are a new method of displaying and processing data in accordance with previously known physical laws.

GOALS OF THE INVENTION

The main goal of the present invention is to provide a new graphical method of analyzing quantum systems. A computer implementation of the method can be used by researchers to design new quantum systems, or to model already existing ones, and to calculate the theoretically expected behavior for such systems. A computer implementation of the method can also be used by educators to teach Quantum Mechanics.

SUMMARY OF THE INVENTION

To analyze a quantum system according to the method of the present invention, one performs the following steps: First, one enters into the computer some information about the system by portraying it in terms of a special type of graph (diagram). Then one enters additional information that is not contained in the graph. Finally, the computer uses the entered information to do calculations, and it outputs the results of these calculations. The computer output consists mainly of conditional probabilities for the outcomes of measurements performed on the system.

The graph consists of a collection of nodes with arrows connecting some pairs of these nodes. The graph must satisfy certain constraints. For example it should not contain any cycles.

The non-graph information that must be entered into the computer consists mainly of "node matrix" for each node. The entries of a node matrix are complex numbers.

A QB net consists of two parts: a labelled graph, and a collection of node matrices.

We assign a random variable to each node. The random variable assigned to a node may, assume a finite number of states.

A net story is defined as an assignment of a specific state to each node of the net.

Each net story has a net amplitude. Net amplitudes are defined as certain products of the entries of the node matrices.

Node matrices and net amplitudes must satisfy certain constraints imposed by the laws of Quantum Mechanics.

The calculation of conditional probabilities involves either performing sums over states, or sums over all possible stories.

BRIEF DESCRIPTION OF THE DRAWINGS

FIG. 5 shows window 70's contents, which are hidden in FIG. 4. The data in FIG. 5 refer to the $\hat{x}_4$ node. The user must provide similar data for each node.

FIG. 10 shows the definitions of the sets $\zeta_j$ alluded to in FIGS. 8 and 9.

DETAILED DESCRIPTION OF THE INVENTION

Figure 1:
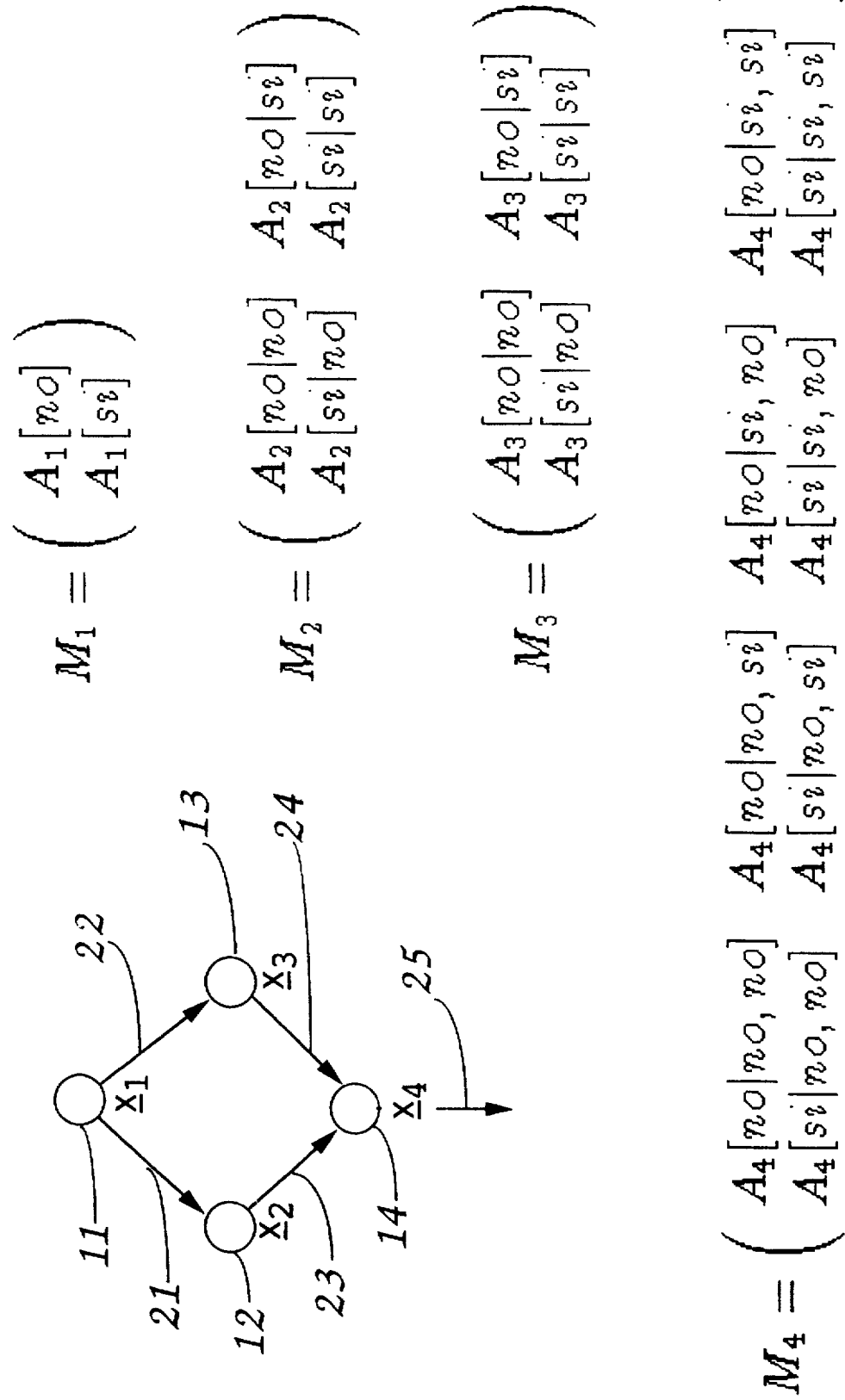
FIG. 1 shows a labelled graph and the four node matrices associated with the four nodes of the graph. A QB net consists of 2 parts: a labelled graph and a collection of node matrices, one matrix for each node.

The method of this invention was first proposed in Ref-Tucci-95. Ref-Tucci-95 is incorporated herein by reference.

This invention consists of a new method of displaying and processing information about a quantum system, and of the use of a computer to implement the method.

We divide this section into 2 parts: (A)NEW METHOD, and (B)COMPUTER IMPLEMENTATION OF NEW METHOD. Part A will describe the method independently of any details having to do with a computer implementation. Then part B will describe an example of a computer implementation of the method.

(A)NEW METHOD

To analyze a quantum system according to the method of the present invention, one performs the following steps: First, one collects some information about the system by portraying it in terms of a special type of graph (diagram). Then one collects additional information that is not contained in the graph. Finally, one uses the information collected to calculate conditional probabilities for the outcomes of measurements performed on the quantum system.

Next we will describe these steps more precisely.

We call a graph (or a diagram) a collection of nodes (bounded shapes) with arrows connecting some pairs of these nodes. The arrows of the graph must satisfy certain constraints that will be specified below. We call a labelled graph a graph whose nodes are labelled. A QB net (consists of two parts: a labelled graph with each node labelled by a random variable, and a collection of node matrices, one matrix for each node. These two parts must satisfy certain constraints that will be specified below.

We define two kinds of arrows: an internal arrow is an arrow that has a starting (source) node and a different ending (destination) one; an external arrow is an arrow that has a starting node but no ending one. We define two types of nodes: an internal node is a node that has one or more internal arrows leaving it, and an external node is a node that has a single external arrow leaving it. It is also common to use the terms root node or prior probability node for a node which has no incoming arrows, only outgoing ones. We restrict all nodes of a graph to be either internal or external. Hence, each node has either: (1) an external arrow leaving it, or (2) one or more internal arrows leaving it, but not both (1) and (2).

We restrict our attention to acyclic graphs: that is, graphs that do not contain cycles. (A cycle is a closed path of arrows with the arrows all pointing in the same sense.)

We assign a random variable to each node of the QB net. (Henceforth, we will underline random variables. For example, we might write $P(\hat{x}=x)$ for the probability that the random variable $\hat{x}$ assumes the particular value x.) Suppose the random variables assigned to the N nodes are $\hat{x}_1, \hat{x}_2, \ldots, \hat{x}_N$. For each $j \in \{1,2,\ldots,N\}$, the random variable $\hat{x}_j$ will be assumed to take on values within a finite set $\Sigma_j$ called the set of possible states of $\hat{x}_j$.

For example, consider the net of FIG. 1. Arrows 21, 22, 23 and 24 are internal, whereas arrow 25 is external. Nodes 11, 12 and 13 are internal and node 14 is external. Node 11 is a root node. There are four nodes so N=4. We will assume that the four nodes must lie in one of two states: either no or si. Thus, $\Sigma_1 = \Sigma_2 = \Sigma_3 = \Sigma_4 = \{no, si\}$.

Define $Z_N = \{1,2,\ldots,N\}$. For any finite set S, let |S| be the number of elements in S. If $S = \{k_1, k_2, \ldots, k_{|S|}\} \subset Z_N$, and $k_1 < k_2 < \ldots < k_{|S|}$, define $(x.)_S = (x_{k_1}, x_{k_2}, \ldots, x_{k_{|S|}})$ and $(\hat{x}.)_S = (\hat{x}_{k_1}, \hat{x}_{k_2}, \ldots, \hat{x}_{k_{|S|}})$. Sometimes, we also abbreviate $(x.)_{Z_N}$ (i.e., the vector that includes all the possible $x_j$ components) by just x., and $(\hat{x}.)_{Z_N}$ by just $\hat{x}$..

For example, suppose N=4. One has $Z_4 = \{1,2,3,4\}$. If $S = \{1,3\}$, then |S|=2. Furthermore, $(x.)_S = (x_1, x_3)$ and $(\hat{x}.)_S = (\hat{x}_1, \hat{x}_3)$. One defines $x. = (x.)_{Z_4} = (x_1, x_2, x_3, x_4)$ and $\hat{x} = (\hat{x}.)_{Z_4} = (\hat{x}_1, \hat{x}_2, \hat{x}_3, \hat{x}_4)$.

Each possible value x. of $\hat{x}$. defines a different net story.

For example, a possible story for the net of FIG. 1 is the case when $\hat{x}_1 = \hat{x}_2 = si$ and $\hat{x}_3 = \hat{x}_4 = no$. This net story may also be represented by $\hat{x}. = (si, si, no, no)$. Since we are assuming that each of the four nodes of FIG. 1 can assume two states, there are total of $2^4 = 16$ stories possible for the net of FIG. 1.

For each net story, we may assign an amplitude to each node. This may be done as follows: For each $j \in Z_N$, we imagine node $\hat{x}_j$ to lie in state $\hat{x}_j$. We also imagine all arrows leaving the node $\hat{x}_j$ to lie in state $\hat{x}_j$, and thus we label all of them $x_j$. At this point we've shown how to label each arrow in the graph by $x_k$ for some $k \in Z_N$. Define $S_j$ to be the set of all k such that an arrow labelled $x_k$ enters node $\hat{x}_j$. Now we assign a complex number $A_j[x_j|(x.)_{S_j}]$ to node $\hat{x}_j$. We call $A_j[x_j|(x.)_{S_j}]$ the amplitude of node $\hat{x}_j$ within net story x..

For example, consider a particular net story, call it $(x_1, x_2, x_3, x_4)$, of FIG. 1. No arrow enters node $\hat{x}_1$ so both $S_1$ and $(x.)_{S_1}$ are empty. Node $\hat{x}_2$ is entered by an arrow from node $\hat{x}_1$ so $S_2=\{1\}$ and $(x.)_{S_2}=(x_1)$. Likewise, $S_3=\{1\}$ and $(x.)_{S_3}=(x_1)$. Finally, $S_4=\{2,3\}$ and $(x.)_{S_4}=(x_2,x_3)$. We assign the complex number $A_1[x_1]$ t node $\hat{x}_1$, $A_2[x_2|x_1]$ to node $\hat{x}_2$, $A_3[x_3|x_1]$ to node $\hat{x}_3$, and $A_4[x_4|x_2,x_3]$ to node $\hat{x}_4$.

The amplitude of net story x., call it A(x.), is defined to be the product of all the node amplitudes $A_j[x_j|(x.)_{S_j}]$ for $j \in Z_N$. Thus, $$A(x.) = \Pi_{j \in Z_N} A_j[x_j|(x.)_{S_j}]. \tag{1}$$

For example, consider a particular net story call it $(x_1, x_2, x_3, x_4)$, of FIG. 1. One has that $$A(x_1,x_2,x_3,x_4) = A_1[x_1]A_2[x_2|x_1]A_3[x_3|x_1]A_4[x_4|x_2,x_3]. \tag{2}$$

The function $A_j$ with values $A_j[x_j|(x.)_{S_j}]$ determines a matrix that we call the node matrix of node $\hat{x}_j$, and denote by $M_j$. $x_j$ is the matrix's row index and $(x.)_{S_j}$ is its column index.

For example, FIG. 1 gives the four node matrices $M_1, M_2, M_3, M_4$ associated with the four nodes of the graph shown there.

We assume that the quantities $A_j[x_j|(x.)_{S_j}]$ satisfy $$\sum_{x_j} |A_j[x_j|(x.)_{S_j}]|^2 = 1, \tag{3}$$

where the sum in Eq.(3) is over all states $x_j$ that the random variable $\hat{x}_j$ can assume, and where Eq.(3) must be satisfied for all $j \in Z_N$ and for all possible values of the vector $(\hat{x}.)_{S_j}$ of random variables.

For example, Eq.(3) means the following for FIG. 1. If x and y are the two elements of ANY column of ANY of the matrices $M_1, M_2, M_3$ or $M_4$, then $|x|^2+|y|^2=1$.

Let $Z_N^{ext}$ be the set of all $j \in Z_N$ such that $\hat{x}_j$ is an external node, and let $Z_{NN}^{int}$ be the set of all $j \in Z_N$ such that $\hat{x}_j$ is an internal node. Clearly, $Z_N^{ext}$ and $Z_N^{int}$ are disjoint and their union is $Z_N$.

For example, for FIG. 1 one has that $Z_4^{ext}=\{4\}$ and $Z_4^{int}=\{1,2,3\}$.

We assume that A(x.) satisfies $$\sum_{(x.)_{Z_N^{ext}}} \left| \sum_{(x.)_{Z_N^{int}}} A(x.) \right|^2 = 1. \tag{4}$$

Equation (4) can be described by saying that we attribute unit probability to the collection of all the net stories associated with the graph being considered.

For example, for FIG. 1, Eq.(4) becomes:

$$\sum_{x_4} \left| \sum_{(x_1,x_2,x_3)} A(x_1, x_2, x_3, x_4) \right|^2 = 1, \tag{5}$$

where the sum over $x_1$ ranges over the values no and si, and similarly for the sums over $x_2, x_3$ and $x_4$.

Given two sets R and S, we define the direct product set R×S by $$R \times S = \{(x,y) | x \in R, y \in S\}. \tag{6}$$

R×S is also denoted by the vector of sets (R,S). Given any set S and any integer n, we will use $S^n$ to denote the product S×S× . . . ×S of n copies of S.

For example, if R={1,2} and S={1,2,3}, then R×S=(R,S)={(1,1), (1,2), (1,3), (2,1) (2,2), (2,3)}.

Suppose $Q_j \subset \Sigma_j$ for each $j \in Z_N$, where $\Sigma_j$ is the set of states of $\hat{x}_j$. If $S=\{k_1,k_2,\ldots,k_{|S|}\} \subset Z_N$, and $k_1<k_2<\ldots<k_{|S|}$, define the vector of sets or direct product set $(Q.)_S$ by $(Q.)_S=(Q_{k_1},Q_{k_2},\ldots Q_{k_{|S|}})$ Equivalently, one may write $(Q.)_S=Q_{k_1}\times Q_{k_2}\times \ldots \times Q_{k_{|S|}}$. Note that $(Q.)_S \subset (\Sigma)_S$. Sometimes, we will abbreviate $(Q.)_{Z_N}$ by just Q..

For example, if $Q_1=Q_2=\{no,si\}$, $Q_3=Q_4=\{si\}$ and S={1, 3}, then $(Q.)_S=(Q_1,Q_3)=Q_1 \times Q_3$ and $Q.=(Q.)_{Z_4}=(Q_1,Q_2,Q_3,Q_4)=Q_1\times Q_2\times Q_3\times Q_4$.

Suppose that $S \subset Z_N$ and $E. \subset \Sigma.$. We wish to calculate $P[(\hat{x}.)_S=(x.)_S|\hat{x}. \in E.]$, i.e., the conditional probability that $\hat{x}_j=x_j$ for all $j \in S$, given that for all $k \in Z_N$, $x_k \in E_k$. $x_j$ is the hypothesis for $\hat{x}_j$, and $E_k$ is the set of active states the evidence, for $\hat{x}_k$.

For example, for the net of FIG. 1, we might be interested in the case that S={1,3}, $(x.)_S=(si,si)$, $E_1=E_2=\{no,si\}$ and $E_3=E_4=\{si\}$. Then $P[(\hat{x}.)_S=(x.)_S|\hat{x}. \in E.]$ represents the probability that $\hat{x}_1=si$ and $\hat{x}_3=si$, taking into consideration that $\hat{x}_1 \in E_1, \hat{x}_2 \in E_2, \hat{x}_3 \in E_3$ and $\hat{x}_4 \in E_4$.

We conclude this section by explaining how to calculate conditional probabilities from the information associated with a QB net.

For any function K(x.) that maps $\Sigma$. into the complex numbers, one may define the characteristic functional $\chi.[K]$ by $$\chi[K] = \sum_{(x.)_{Z_N^{ext}}} \left| \sum_{(x.)_{Z_N^{int}}} A(x.)K(x.) \right|^2. \tag{7}$$

In particular, let $$K\{(y.)_s, E.\}(x.) = \begin{cases} 1 & \text{if } (y.)_s = (x.)_s \text{ and } x.\in E. \\ 0 & \text{otherwise.} \end{cases} \tag{8}$$

Then the law of Quantum Mechanics define the conditional probability $P[(\hat{x}.)_S=(x.)_S|\hat{x}. \in E.]$ as follows.

$$P[(\hat{x}.)_s = (x.)_s|\hat{x}.\in E.] = \frac{\chi[K\{(x.)_s, E.\}]}{\sum_{(y.)_s} \chi[K\{(y.)_s, E.\}]}. \tag{9}$$

To calculate the conditional probability indicated by the left hand side of Eq.(9), one may use Eq.(9) directly. That is, one may perform all the sums over states that are indicated by the right hand side of Eq.(9). Alternatively, one may try to re-express the right hand side of Eq.(9) in terms of sums over stories rather than sums over states. Ref-Tucci-95, especially in Appendix-B, presents this alternative way of expressing the right hand side of Eq.(9). (Note that Ref-Tucci-95 refers to sums over stories as sums over "paths"). Usually, calculating conditional probabilities by summing over stories rather than summing over states requires significantly fewer arithmetical operations. However, summing over stories requires that one find the set of possible stories (by "possible" stories we mean stories with non-vanishing amplitudes), whereas such a set need not be found when summing over states. Luckily, when summing over stories, one need not store in computer memory the whole set of possible stories all at once, something that could be very expensive memory-wise. Instead, one can find and store this set in a piecemeal fashion, a few elements at a time. Finding the set of possible stories, either all at once or in a piecemeal fashion, can be done in a variety of ways, using iteration, recursion, etc. Appendix A of this document discusses a recursive, piecemeal method of calculating the set of possible stories.

(B) COMPUTER IMPLEMENTATION OF NEW METHOD

So far in Section (A), we have described a new method of displaying and processing information about a quantum system. Next we describe how to implement this method on a computer.

The use of a computer is practically indispensable for obtaining useful numerical answers through the method of Section (A). A computer screen is highly useful in the drawing and designing of a net. Furthermore, in all but the simplest of cases, vast amounts of data storage and processing are necessary to obtain final numerical answers from the method of Section (A). The necessary book-keeping and number crunching are prohibitively error prone and time consuming to a human, but not to a computer.

Figure 2:
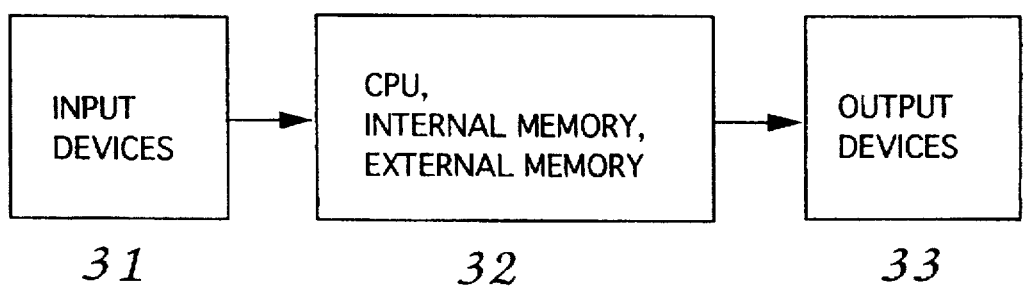
FIG. 2 shows a block diagram of a Mac computer.

In its preferred embodiment, this invention is a Macintosh™ (Mac) application running on a Mac computer. Mac computers are produced by Apple Computer Inc. of Cupertino, Calif. Of course, the method of this invention could just as easily be implemented on other computer platforms. We choose to speak in this document about the Mac platform so that we can make our discussion more definite. FIG. 2 is a block diagram of a Mac computer. Block 31 represents input devices, such as a mouse or a key board. Block 32 represents the CPU, internal and external memory units. Block 32 does calculations and stores information. Block 33 represents output devices, such as a printer or a display screen. The preferred embodiment of the invention is written in the computer language C++, using Power-Plant™. Power Plant, a collection of C++ code that serves as a framework for developing Mac applications, is produced by MetroWerks Inc. of Austin, Tx. The *Inside the Macintosh* series of books, written by Apple Computer, and published by Addison Wesley, describes how to program a Mac, and lays out strict stylistic guidelines for Mac software. This embodiment of the invention follows the programming advice of those books wherever possible. In describing this embodiment. I will use the same terminology as those books whenever possible.

Figure 3:
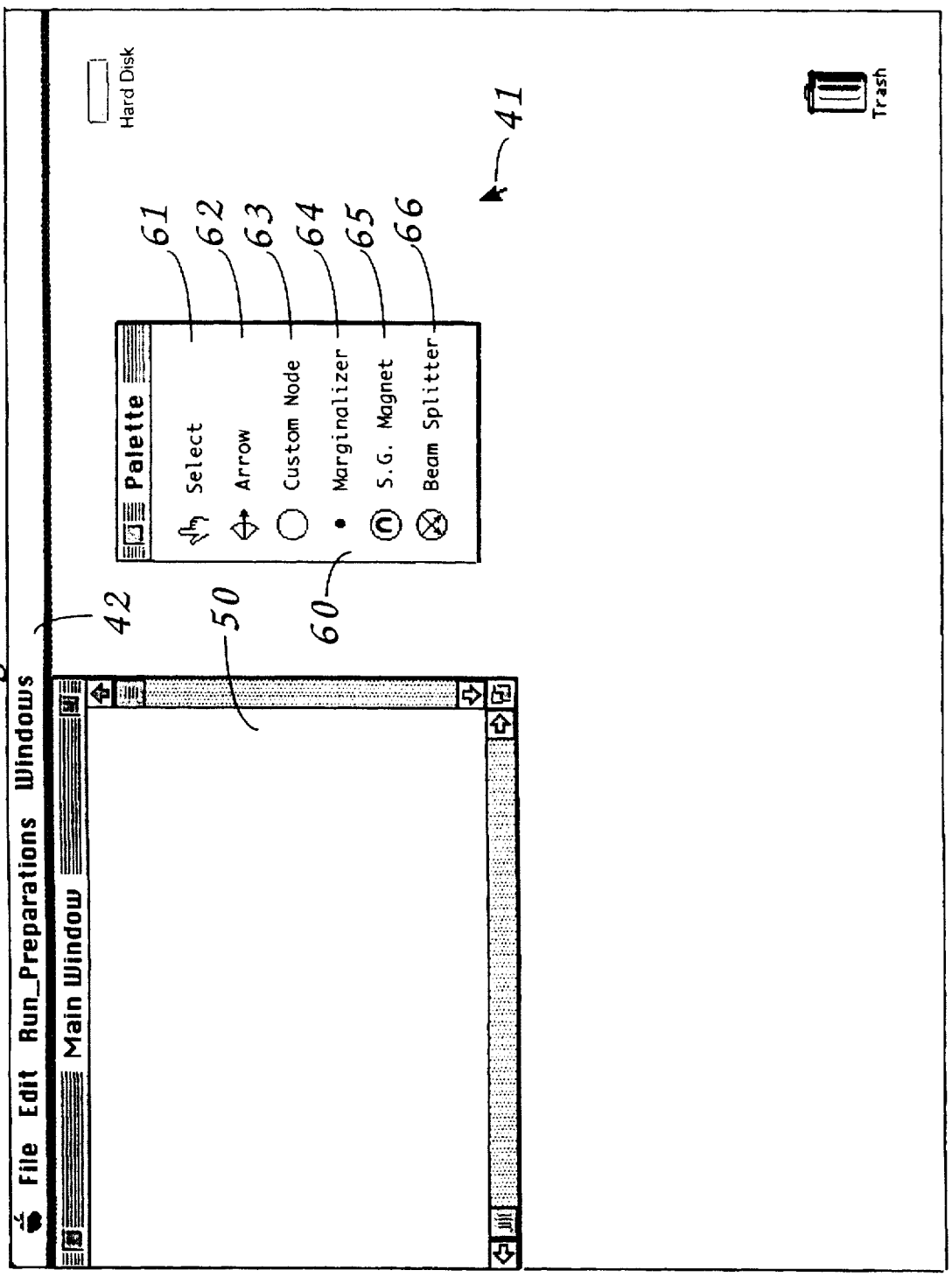
FIG. 3 shows the computer screen as seen immediately after the user starts the Mac application that is the preferred embodiment of this invention.

Consider FIG. 3.

FIG. 3 shows what the user sees on the monitor screen (the "desktop") immediately after starting the application. Cursor 41, Menu Bar 42, Main Window 50, and Palette 60 are all elements commonly found in the interfaces of Mac applications. These elements are operated by the user, and respond to his actions, the same way they are operated and respond in other Mac drawing applications. By placing the cursor over icons of the palette, and then clicking the mouse, the user can select various tools. These include Selection tool 61, Arrow tool 62, Custom Node tool 63, as well as other types of non-custom node tools like 64, 65 and 66.

Figure 4:
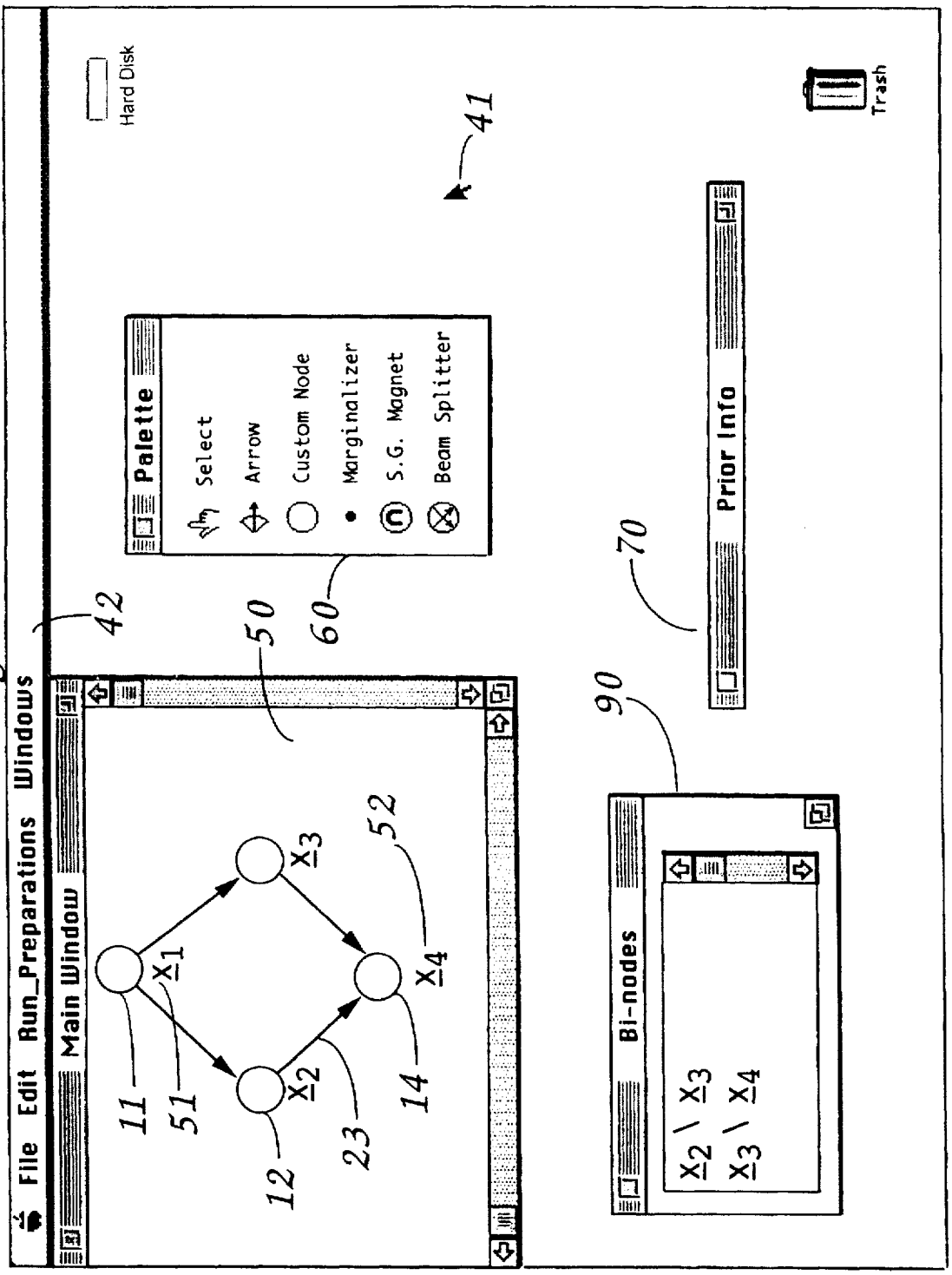
FIG. 4 shows the computer screen after having drawn a labelled graph in Main Window 50 and after having selected some bi-nodes.

Now consider FIG. 4

Contrary to FIG. 3, FIG. 4 has a drawing inside Main Window 50. To draw inside window 50, one proceeds as follows.

Suppose window 50 is empty and one selects the Custom Node tool on the palette. If one now places cursor 41 on window 50 and clicks, then circle 11 appears. Circle 11, which represents a node, is centered at the point where the mouse was clicked, and has an editable field 51 beneath it. The editable field contains the default name $x_1$; the user can change this default name by placing the cursor inside field 51, clicking, and then typing in a new name.

Suppose there are two nodes 12 and 14 on Mian Window 50, and that one selects the Arrow tool 62 on the palette. If one now: places cursor 41 inside circle 12; presses the mouse button down, and keeps it down while one drags the cursor to circle 14; releases the mouse button once the cursor is inside circle 14; then arrow 23 connecting circles 12 and 14 appears.

As a stylistic choice, the preferred Mac embodiment of this invention does not allow the user to draw external arrows. Only internal arrows. i.e., those that have both a source and a destination node, can be drawn. No confusion or ambiguity arises if external arrows are not shown explicitly.

Repeating the above actions, one can draw a plurality of nodes and arrows inside Main Window 50. One finally obtains a labelled graph like that of FIG. 4. Besides a labelled graph, a QB net comprises a matrix for each node. We discuss this next.

In going from FIG. 3 to FIG. 4, two new windows, 70 and 90, have been opened. The Prior Info window 70 may be opened by double-clicking on any of the nodes in Main Window 50. The Bi-nodes window 90 may be opened by choosing the menu item "Show Bi-nodes" from the "Windows" menu on Menu Bar 42. When the user first opens the Bi-nodes window 90, its list is empty. FIG. 4 shows two entries in this list. To enter an entry into this list, the user must press down the "2" key, and, while keeping this key down, click successively on two different nodes. For example, to get the first entry in the list of window 90 of FIG. 4, the user clicked on nodes $x_2$ and $x_3$, while keeping key "2" down. The user may delete entries from this list be selecting the entry and pressing the delete key.

Now consider FIG. 5.

In FIG. 4, the contents of window 70 are hidden. FIG. 5 illustrates the contents of window 70.

A window similar to that shown in FIG. 5 can be obtained by double-clicking on any of the nodes in Main Window 50 of FIG. 4. For definiteness, FIG. 5 shows what happens when one double-clicks on the node labelled $x_4$. Editable field 71 of FIG. 5, which agrees with the editable field 52 of FIG. 4, gives the name of the node that was double-clicked. The computer keeps a list of the four nodes of the net. If the user clicks on button 72 (labelled "First"), editable field 71 displays the first member of this list. Succesive members of the list are displaced when the user clicks on button 73 (labelled "Next"). All node dependent data in window 70 always refers to the node listed in editable field 71.

The user must enter into editable field 74 the degeneracy of node $x_4$; that is, the number of states that node $x_4$ can assume.

The user must enter into column 80 the names of the states which node $x_4$ can assume. Each node $x_j$ has a set $\Sigma_j$ of possible states, where $j \in \{1,2,3,4\}$. According to FIG. 5, $\Sigma_4=\{no,si\}$. For definiteness, we will assume $\Sigma_1=\Sigma_2=\Sigma_3=\Sigma_4$.

By clicking in column 79, in front of the name of a state, the user can toggle between a blank space and a bullet-hole. A bullet-hole in front of a state indicates that the state is active and a blank space that it isn't. Each node $x_j$ has a set $E_j$ of active states, where $j \in \{1,2,3,4\}$. According to FIG. 5: $E_4=\{no,si\}$; that is, all the states of $x_4$ are active. One could also consider cases where only one or no states of $x_4$ were active.

According to the drawing in Main Window 50 of FIG. 4, node $x_4$ is entered by two arrows, and the source nodes of these two arrows are nodes $x_2$ and $x_3$. Column 75 of FIG. 5 lists these 2 source nodes, and column 76 lists the current state of these nodes. Since we are assuming that node $x_2$ may assume 2 possible states and node $x_3$ may assume 2 possible states, column 76 can display a total of (2 times 2)=4 possible combinations of states for nodes $\hat{x}_2$ and $\hat{x}_3$. The computer keeps a list of these four combinations. If the user clicks on button 77 (labelled "First"), column 76 displays the first member of this list. Succesive members of the list are displayed when the user clicks on button 78 (labelled "Next"). One may think of an arrow as lying in the same state as its source node. Thus, the entries of column 76 can be thought of as the states of the two arrows entering node $\hat{x}_4$. The four combinations of the states of the incomming arrows can be thought of as the four possible initial conditions for node $\hat{x}_4$.

Each cell in columns 81 and 82 is an editable field that accepts a signed decimal number. For each state the 2 decimal numbers in columns 81 and 82 represent, respectively, the real and imaginary parts of the complex amplitude associated with that state. Columns 81 and 82 change every time the user presses button 78 (labelled "Next"). Thus, the user must enter different columns 81 and 82 for each of the four possible initial conditions for node $\hat{x}_4$. The entries of columns 81 and 82 are what we denoted by the symbol $A_j[x_j|(x.)_s]$ in Section (A). According to FIG. 5, $A_4[\hat{x}_4=no|\hat{x}_2=si,\hat{x}_3=si]=0.5-i(0.5)$, $A_4[\hat{x}_4=si|\hat{x}_2=si,\hat{x}_3=si]=0.7071+i(0)$.

Caption 83 is not directly editable by the user. It gives the total probability implied by the currently displayed columns 81 and 82. In other words, the computer calculates the square of every number in columns 81 and 82, adds all these squares, and displays the result in caption 83. According to Eq.(3) of Section (A), caption 83 should show a number that is very close to 1. The user may insert numbers into columns 81 and 82 such that caption 83 shows a number that is far from 1. But if he does so, and then chooses the "Go!" menu item from the menus on the menu bar, the computer will put up an alert box advising the user that he should first get all his probability captions to within, say, $10^{-3}$ of 1. The computer should also notify the user if Eq.(4) of Section (A) is not satisfied.

The example in FIG. 5 refers to a custom node. If node $\hat{x}_4$ were not a custom node, i.e., if it had been drawn with, for example the S.G. Magnet tool 65 of Palette 60, then the window shown in FIG. 5 would have been different as follows. The numbers in columns 81 and 82 would have been assigned automatically by the computer instead of being entered manually (or being imported from an external file) by the user.

Figure 6:
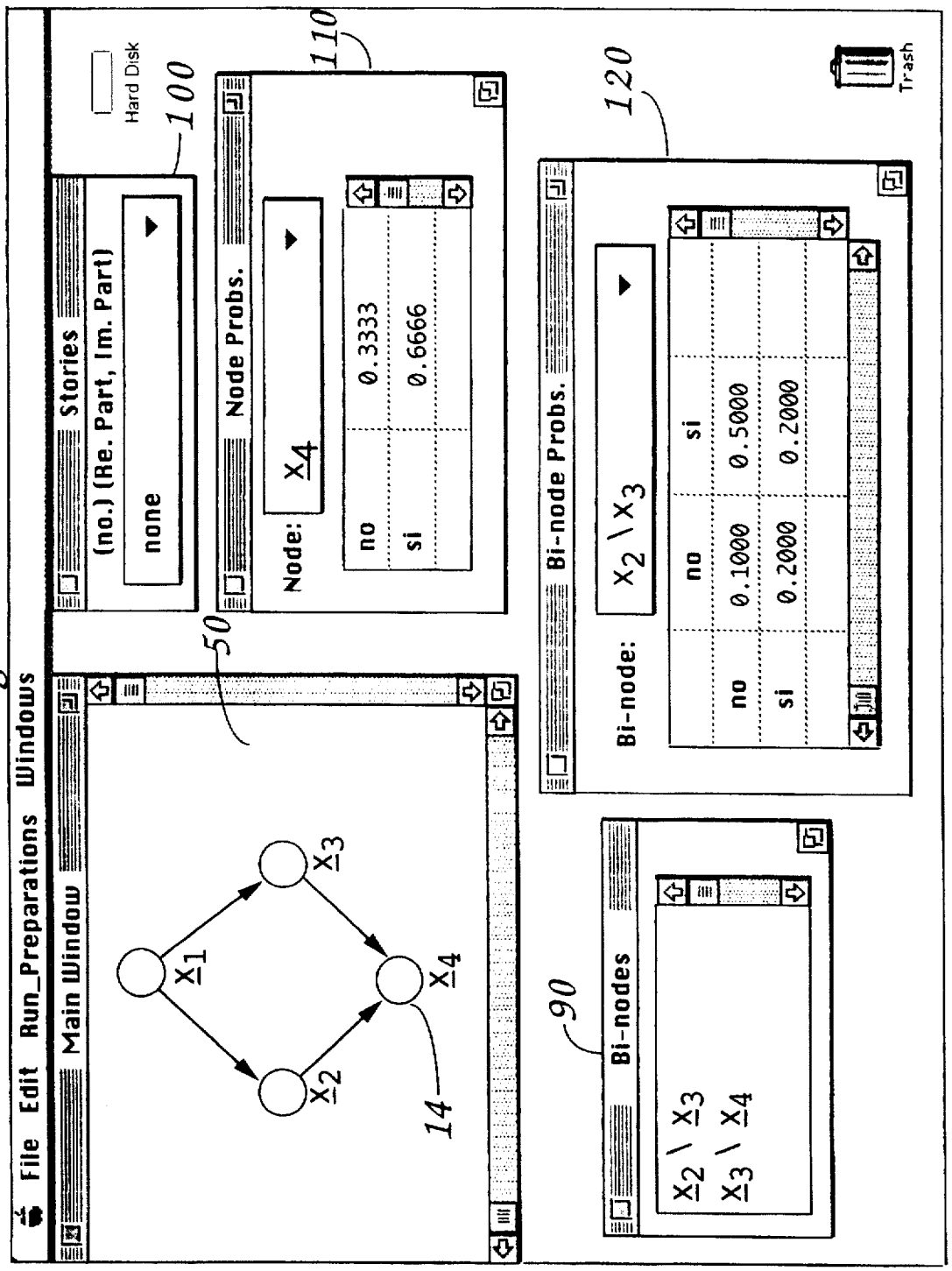
FIG. 6 shows the computer screen as it might look after having chosen the "Go!" menu item from the menus on the menu bar. Upon receiving the "Go!" command, the computer calculates the probabilities for all nodes, and for those bi-nodes listed in window 90.

Now consider FIG. 6.

Like FIGS. 3 and 4, FIG. 6 shows the full computer screen. To go from the screen contents of FIG. 4 to those of FIG. 6, one proceeds as follows. One closes windows 60 (Palette) and 70 (Prior Info) and one chooses the "Go!" menu item from the menus on the menu bar. Next, by choosing the "Show Net Stories" menu item, one opens window 100. By double clicking on node 14, one opens window 110. By double clicking on the entry "$\hat{x}_2\backslash\hat{x}_3$" of the list box of window 90, one opens window 120.

Window 110 refers to node 14, but one could open a similar window for any of the nodes of the graph, just by double clicking on the node. The first column of window 110 gives the states of node 14. The second column gives the probabilities of measuring each of these states. The entries of the second column of window 110 can be denoted, using the notation of Section (A), by $P[\hat{x}_4=x_4|\hat{x}_1 \in E_1, \hat{x}_2 \in E_2, \hat{x}_3 \in E_3, \hat{x}_4 \in E_4]$, where $x_4$ equals either no or si.

Window 120 refers to bi-node "$\hat{x}_2\backslash\hat{x}_3$", but one could open a similar window for any of the bi-nodes listed in window 90, just by double clicking on the bi-node's name in that list. Window 120 shows a table of probabilities. The rows of the table are labelled by the states that $\hat{x}_2$ can assume, no and si, whereas the columns of the table are labelled by the states that $\hat{x}_3$ can assume, which also happen to be no and si. The numerical entries of this table can be denoted, using the notation of Section (A), by $P[\hat{x}_2=x_2,\hat{x}_3=x_3|\hat{x}_1 \in E_1, \hat{x}_2 \in E_2, \hat{x}_3 \in E_3, \hat{x}_4 \in E_4]$, where $x_2$ equals either no or si, and $x_3$ equals either no or si.

Figure 7:
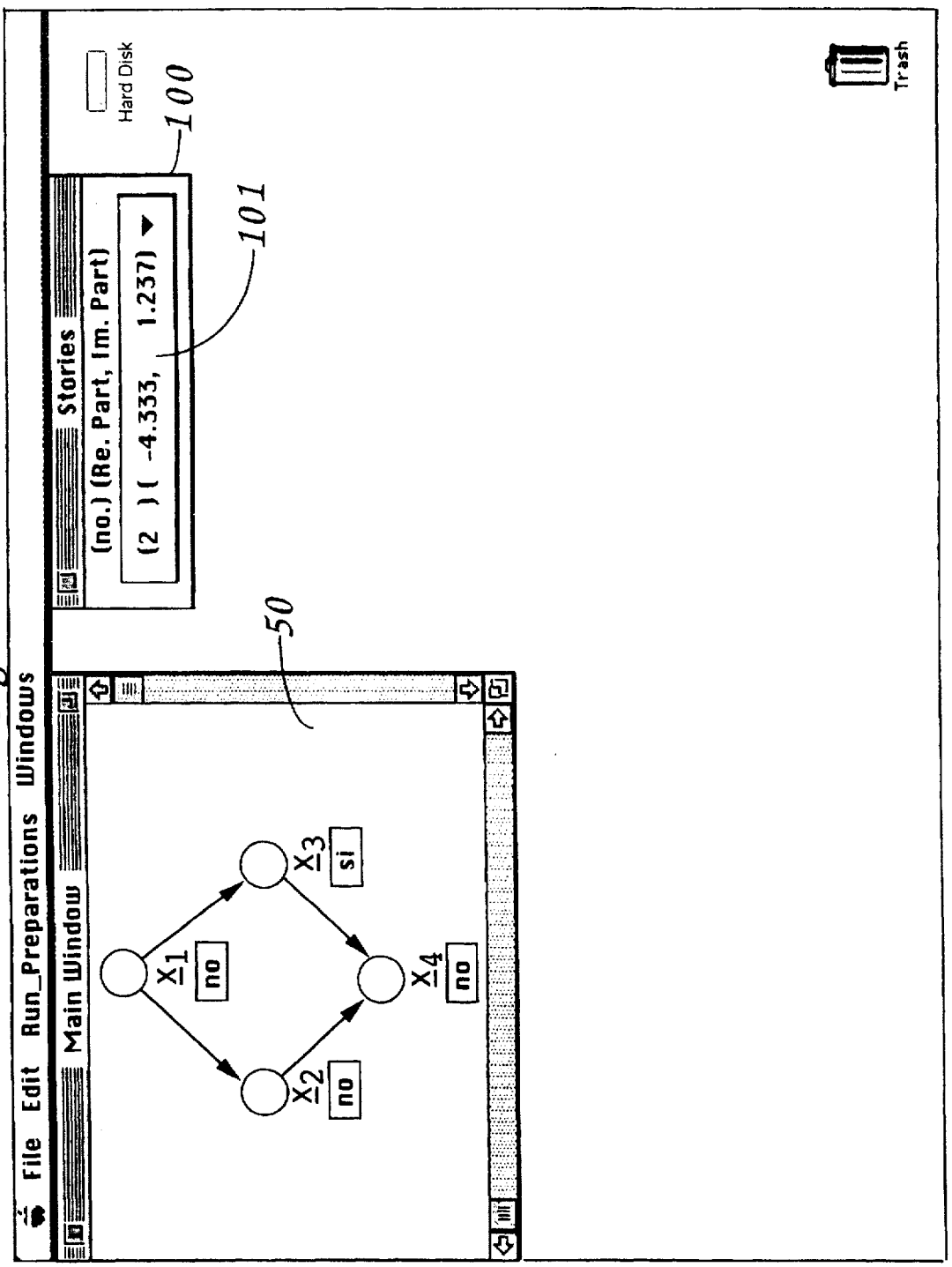
FIG. 7 shows the computer screen as it might look after having chosen the "Go!" menu item from the menus on the menu bar. The second net story with non-zero amplitude has been chosen from pop-up menu 101. The graph in window 50 shows the state assigned to each node by this particular net story.

Now consider FIG. 7.

To go from FIG. 6 to FIG. 7, one closes windows 90, 110 and 120. One also operates pop-menu 101 as follows.

Upon pulling down pop-up menu 101, one sees a list beginning with "none" and then listing all net stories with a non-zero amplitude. The net stories are labelled by: the position of the story in the list, and the complex amplitude of the story. For example, an entry (2)(-4.333, 1.237) means that the second story in the list of stories has a complex amplitude -4.333+i(1.237). As is usual for Mac pop-up menus, upon pulling down pop-menu 101, the currently selected item will have a check mark in front of it. When the pop-up menu is not being held down, its face shows the current selection. As shown in FIG. 6, immediately after choosing the "Go!" menu item, pop-up menu 101 will show "none" as the current selection. To go from FIG. 6 to FIG. 7, the user has changed the current selection in pop-up menu 101 from "none" to the list's second net story, which has a complex amplitude -4.333+i(1.237). Choosing a pop-up menu selection other than "none" caused the drawing inside window 50 to change from what is shown in FIG. 6 to what is shown in FIG. 7. Window 50 of FIG. 7 shows the same labelled graph as window 50 of FIG. 6, but, in addition, it shows the state assumed by each node for the particular net story labelled (2)(-4.333, 1.237).

So far, we have described what are at present the preferred embodiments of this invention. Those skilled in the art will be able to come up with many, modifications to the given embodiments without departing from the present invention. It is therefore desired that the scope of the invention be determined by the appended claims rather than by the given embodiments.

APPENDIX A

In calculating conditional probabilities by summing over stories, the following task arises. For some $Q. \subset \Sigma$, one must find the set of all net stories x. such that x. $\in Q$. and $A(x.) \neq 0$. In this appendix, we present a possible way of doing this in a recursive, piecemeal fashion.

We begin by classifying the set of nodes of the graph into eras. The eras of a QB net, are a collection of sets $T_1, T_2, \ldots, T_L$ such that $T_i \subset Z_N$ for all $i \in \{1,2,\ldots,L\}$ and the union of all $T_i$ equals $Z_N$. In mathematical parlance, the collection of eras is a partition of $Z_N$. Call the original graph Graph(L). The last era $T_L$ is defined as the set of all external nodes of Graph(L). (Recall that external nodes were defined previously as those nodes that have no outgoing internal arrows.) Call Graph(L-1) the graph obtained by erasing from Graph (L) all the $T_L$ nodes and era arrows connected to these nodes. Then $T_{L-1}$ is defined as the set of all external nodes of Graph(L-1). One can continue this process until one defines an era $T_1$ such that Graph(0) is empty. (One can show that if Graph(L) is acyclic, then one always arrives at a Graph(0) that is empty.) Of course, one doesn't know the number of eras L until one has found era $T_1$.

For example, for the graph of FIG. 1, L=3 and $T_1=\{1\}$, $T_2=\{2,3\}$, $T_3=\{4\}$.

Rather than defining eras by (1) removing successive layers of external nodes, one can also define them by (2) removing successive layers of root nodes. Because of the form of Eq.(9) for conditional probabilities, it's convenient if all the external nodes of the original graph Graph(L) fall into the same era. This will always occur if we use Definition (1), but it may not occur if we use Definition (2).

Actually, this process whereby one classifies the nodes of an acyclic graph into eras is a well know technique referred to as a chronological or topological sort in the computer literature. See, for example, pg. 369 of *Practical Algorithms in C++* (Wiley, 1995) by Bryan Flamig.

We've been (calling any vector $x. \in \Sigma$, a net story. Analogously we will call any vector $(x.)_{T_i} \in (\Sigma.)_{T_i}$ an ith era story.

Figure 8:
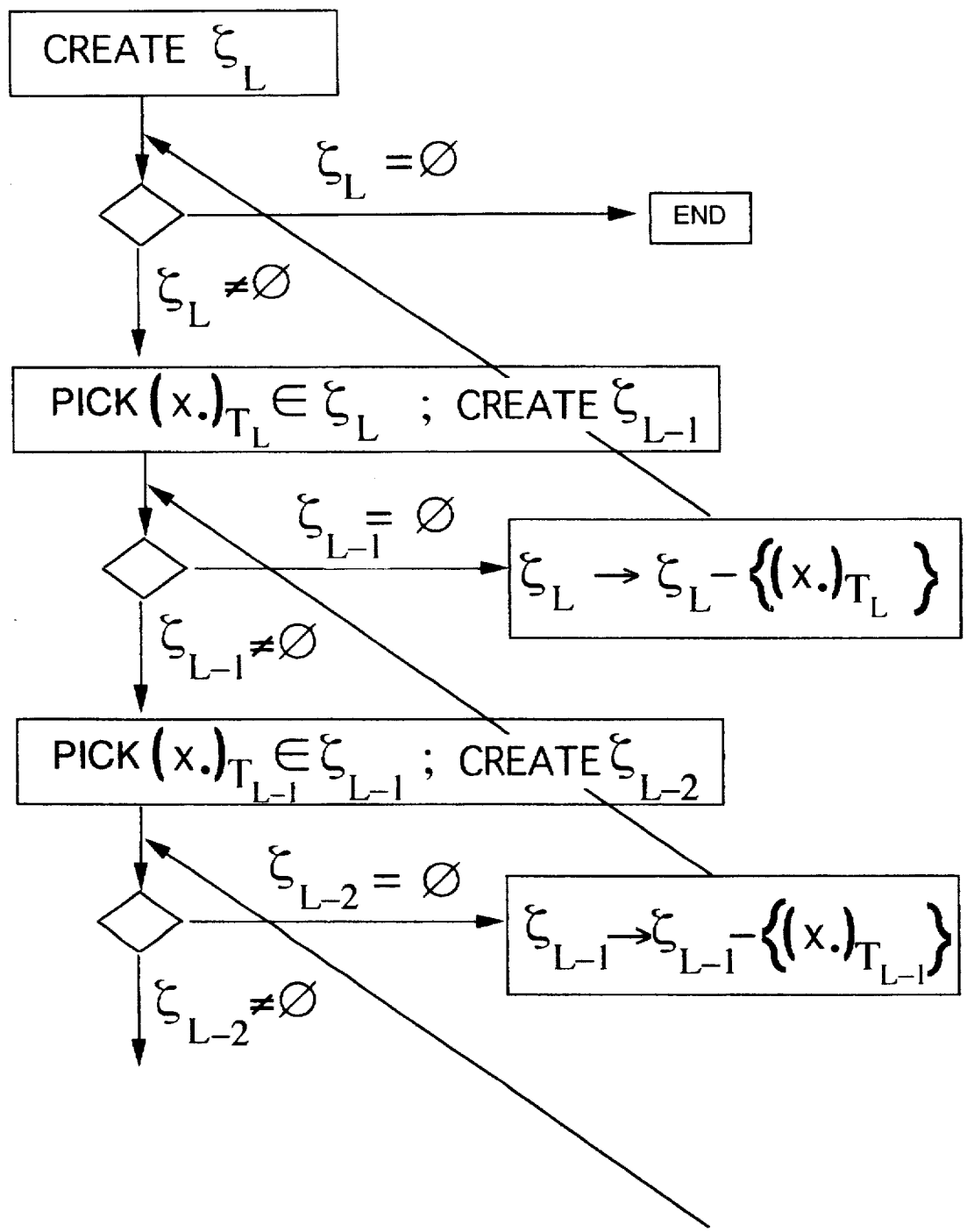
FIG. 8 shows the beginning of a flow chart of a method for finding a set of possible net stories.

Now consider the flow chart in FIG. 8.

One first calculates the set $\zeta_L$ defined in FIG. 10. $\zeta_L$ is a set of L'th era stories with non-vanishing amplitudes.

As indicated in FIG. 8, if $\zeta_L$ is empty, we are done.

If $\zeta_L$ is non-empty, we pick one element $(x.)_{T_L}$ from $\zeta_L$, and use this element to calculate the set $\zeta_{L-1}$ defined in FIG. 10. $\zeta_{L-1}$ is a set of (L-1)'th era stories with non-vanishing amplitudes.

If $\zeta_{L-1}$ is empty, we remove the ineffective element $(x.)_{T_L}$ from $\zeta_L$, and go back to the point where we ask whether $\zeta_L$ is empty or not.

If $\zeta_{L-1}$ is non-empty, we pick one element $(x.)_{T_{L-1}}$ from $\zeta_{L-1}$, and use this element to calculate the set $\zeta_{L-2}$ defined in FIG. 10. $\zeta_{L-2}$ is a set of (L-2)'th era stories with non-vanishing amplitudes.

Figure 9:
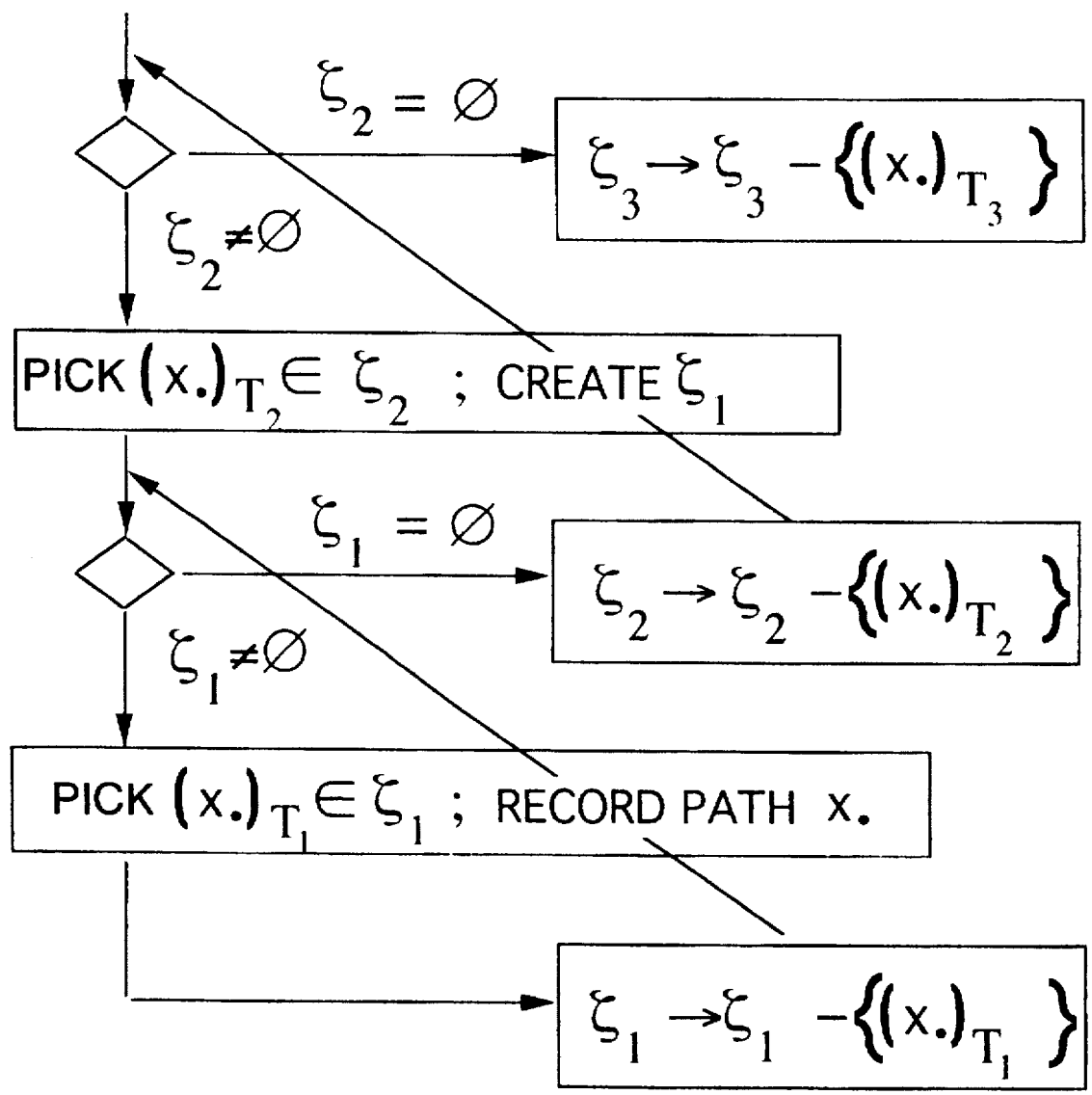
FIG. 9 shows the end of a flow chart of a method for finding a set of possible net stories.

The process continues. Now consider the flow chart in FIG. 9, which shows the conclusion of the process initiated in FIG. 8.

One calculates the set $\zeta_1$ defined in FIG. 10. $\zeta_1$ is a set of first era stories with non-vanishing amplitudes.

If $\zeta_1$ is empty we remove the ineffective element $(x.)_{T_2}$ from $\zeta_2$, and go back to the point where we ask whether $\zeta_2$ is empty or not.

If $\zeta_1$ is non-empty, then we pick an element $(x.)_{T_1}$ from $\zeta_1$, and we congratulate ourselves, for we have found a net story x. such that $x. \in Q.$ and $A(x.) \neq 0$. How we use this net story, and how long we store it in computer memory before forgetting it, depends on the aims and strategy of our computer program. It's time to calculate the next net story. To continue, we remove the element $(x.)_{T_1}$ from $\zeta_1$, and go back to the point where we ask whether $\zeta_1$ is empty or not.

I claim:

1. A method that uses a computer having display, storage and calculation means to analyze a physical system that exhibits quantum mechanical behavior, said method comprising the steps of:

displaying on said display means a graph comprising a plurality of N nodes, and a plurality of directed lines connecting certain pairs of said nodes;

storing in said storage means a knowledge base comprising:

(a) graph information comprising a label for each of said N nodes, and also comprising, for each said directed line, said node label for the source node and for the destination node of the directed line, (b) state information comprising, for each $j \in \{1,2,\ldots N\}$, a finite set $\Sigma_j$ containing labels for the states that the j'th node $\hat{x}_j$ may assume, and (c) amplitude information comprising, for each $j \in \{1,2,\ldots N\}$, a representation of a complex number $A_j[x_j|x_{k_1}, x_{k_2}, \ldots, x_{k_{|S_j|}}]$ for each vector $(x_j, x_{k_1}, x_{k_2}, \ldots, x_{k_{|S_j|}})$ such that $x_j \in \Sigma_j$, $x_{k_1} \in \Sigma_{k_1}$, $x_{k_2} \in \Sigma_{k_2}, \ldots$, and $x_{k_{|S_j|}} \in \Sigma_{k_{|S_j|}}$, wherein $(\hat{x}_{k_1}, \hat{x}_{k_2}, \ldots, \hat{x}_{k_{|S_j|}})$ are the $|S_j|$ nodes connected to $\hat{x}_j$ by directed lines entering $\hat{x}_j$, wherein said directed lines entering $\hat{x}_j$ transmit the state of their source node, wherein said $|S_j|$ is an integer greater or equal to zero;

calculating with said calculation means and with some parts of said knowledge base, the probability that some said node $\hat{x}_j$ will be measured to be in a state $x_j$ contained in $\Sigma_j$.

2. The method of claim 1, wherein said graph is acyclic.

3. The method of claim 2, comprising the additional step of:

calculating with said calculation means and with some parts of said knowledge base, the eras of said graph.

4. The method of claim 1, comprising the additional step of:

calculating with said calculation means and with some parts of said knowledge base, the probability that some pair $(\hat{x}_{j_1}, \hat{x}_{j_2})$ of said nodes will be measured to be in a state $(x_{j_1}, x_{j_2})$, wherein $x_{j_1} \in \Sigma_{j_1}$ and $x_{j_2} \in \Sigma_{j_2}$.

5. The method of claim 1, comprising the additional step of:

calculating with said calculation means and with some parts of said knowledge base, a list of all net stories with non-zero amplitude, wherein a net story is a vector $(x_1, x_2, \ldots, x_N)$ such that $x_1 \in \Sigma_1, x_2 \in \Sigma_2, \ldots,$ and $x_N \in \Sigma_N$, and the amplitude of such a net story is $$\prod_{j \in \{1,2,\ldots,N\}} A_j [x_j|x_{k_1}, x_{k_2}, \ldots, x_{k_{|S_j|}}].$$

6. The method of claim 1, comprising the additional steps of:

storing in said storage means, as part of said knowledge base, active state information comprising, for each $j \in \{1,2,\ldots N\}$, a set $E_j$ of the active states of node $\hat{x}_j$, wherein $E_j$ is a subset of $\Sigma_j$; and calculating with said calculation means and with some parts of said knowledge base, the probability that some said node $\hat{x}_j$ will be measured to be in a state $x_j$ contained in $E_j$, taking into consideration that for each integer $k \in \{1,2,\ldots,N\}$, $\hat{x}_k$ was previously known to lie in one of the states contained in $E_k$.

7. The method of claim 6, wherein said graph is acyclic.

8. The method of claim 7, comprising the additional step of:

calculating with said calculation means and with some parts of said knowledge base, the eras of said graph.

9. The method of claim 6, comprising the additional step of:

calculating with said calculation means and with some parts of said knowledge base, the probability that some pair $(\hat{x}_{j_1}, \hat{x}_{j_2})$ of said nodes will be measured to be in a state $(x_{j_1}, x_{j_2})$, wherein $x_{j_1} \in \Sigma_{j_1}$ and $x_{j_2} \in E_{j_2}$, taking into consideration that for each integer $k \in \{1,2,\ldots,N\}$, $\hat{x}_k$ was previously known to lie in one of the states contained in $E_k$.

10. The method of claim 6, comprising the additional step of:

calculating with said calculation means and with some parts of said knowledge base, a list of all net stories with non-zero amplitude and for which all node states are active, wherein a net story for which all node states are active is a vector $(x_1, x_2, \ldots x_N)$ such that $x_1 \in E_1, x_2 \in E_2, \ldots,$ and $x_N \in E_N$, and the amplitude of such a net story is $$\prod_{j \in \{1,2,...,N\}} A_j[x_j|x_{k_1}, x_{k_2}, \ldots, x_{k_{|S_j|}}].$$

11. A method that uses a computer having storage and calculation means to analyze a physical system that exhibits quantum mechanical behavior, said method comprising the steps of:

storing in said storage means a knowledge base comprising:

(a) graph information comprising a label for each node of a plurality of N nodes, and also comprising a plurality of directed lines, wherein a directed line is an ordered pair of said node labels, wherein one member of said label pair labels the source node and the other member labels the destination node of the directed line, (b) state information comprising, for each $j \in \{1,2,\ldots,N\}$, a finite set $\Sigma_j$ containing labels for the states that the j'th node $\hat{x}_j$ may assume, and (c) amplitude information comprising, for each $j \in \{1,2,\ldots,N\}$, a representation of a complex number $A_j[x_j|x_{k_1}, x_{k_2}, \ldots, x_{k_{|S_j|}}]$ for each vector and $x_{k_{n_j}} \in \Sigma_{k_{n_j}}$, wherein $(\hat{x}_{k_1}, \hat{x}_{k_2}, \ldots, \hat{x}_{k_{|S_j|}})$ are the $|S_j|$ nodes connected to $\hat{x}_j$ by directed lines entering $\hat{x}_j$, wherein said directed lines entering $\hat{x}_j$ transmit the state of their source node, wherein said $|S_j|$ is an integer greater or equal to zero;

calculating with said calculation means and with some parts of said knowledge base, the probability that some said node $\hat{x}_j$ will be measured to be in a state $x_j$ contained in $\Sigma_j$.

12. The method of claim 11, wherein said graph is acyclic.

13. The method of claim 12, comprising the additional step of:

calculating with said calculation means and with some parts of said knowledge base, the eras of said graph.

14. The method of claim 11, comprising the additional step of:

calculating with said calculation means and with some parts of said knowledge base, the probability that some pair $(\hat{x}_{j_1}, \hat{x}_{j_2})$ of said nodes will be measured to be in a state $(x_{j_1}, x_{j_2})$, wherein $x_{j_1} \in \Sigma_{j_1}$ and $x_{j_2} \in \Sigma_{j_2}$.

15. The method of claim 11, comprising the additional step of:

calculating with said calculation means and with some parts of said knowledge base, a list of all net stories with non-zero amplitude, wherein a net story is a vector $(x_1, x_2, \ldots, x_N)$ such that $x_1 \in \Sigma_1, x_2 \in \Sigma_2, \ldots,$ and $x_N \in \Sigma_N$, and the amplitude of such a net story is $$\prod_{j \in \{1,2,...,N\}} A_j[x_j|x_{k_1}, x_{k_2}, \ldots, x_{k_{|S_j|}}].$$

16. The method of claim 11, comprising the additional steps of:

storing in said storage means, as part of said knowledge base, active state information comprising, for each $j \in \{1,2,\ldots,N\}$, a set $E_j$ of the active states of node $\hat{x}_j$, wherein $E_j$ is a subset of $\Sigma_j$; and calculating with said calculation means and with some parts of said knowledge base, the probability that some said node $\hat{x}_j$ will be measured to be in a state $x_j$ contained in $E_j$, taking into consideration that for each integer $k \in \{1,2,\ldots,N\}$, $\hat{x}_k$ was previously known to lie in one of the states contained in $E_k$.

17. The method of claim 16, wherein said graph is acyclic.

18. The method of claim 17, comprising the additional step of:

calculating with said calculation means and with some parts of said knowledge base, the eras of said graph.

19. The method of claim 16, comprising the additional step of:

calculating with said calculation means and with some parts of said knowledge base, the probability that some pair $(\hat{x}_{j_1}, \hat{x}_{j_2})$ of said nodes will be measured to be in a state $(x_{j_1}, x_{j_2})$, wherein $x_{j_1} \in E_{j_1}$ and $x_{j_2} \in E_{j_2}$, taking into consideration that for each integer $k \in \{1,2,\ldots,N\}$, $\hat{x}_k$ was previously known to lie in one of the states contained in $E_k$.

20. The method of claim 16, comprising the additional step of:

calculating with said calculation means and with some parts of said knowledge base, a list of all net stories with non-zero amplitude and for which all node states are active, wherein a net story for which all node states are active is a vector $(x_1, x_2, \ldots, x_N)$ such that $x_1 \in E_1, x_2 \in E_2, \ldots,$ and $x_N \in E_N$, and the amplitude of such a net story is $$\prod_{j \in \{1,2,...,N\}} A_j[x_j|x_{k_1}, x_{k_2}, \ldots, x_{k_{|S_j|}}].$$

21. A method that uses a computer having input and calculation means to analyze a physical system that exhibits quantum mechanical behavior, said method comprising the steps of:

inputting into said input means a knowledge base comprising:

(a) graph information comprising a label for each node of a plurality of N nodes, and also comprising a plurality of directed lines, wherein a directed line is an ordered pair of said node labels, wherein one member of said label pair labels the source node and the other member labels the destination node of the directed line, (b) state information comprising, for each $j \in \{1,2,\ldots,N\}$, a finite set $\Sigma_j$ containing labels for the states that the j'th node $\hat{x}_j$ may assume, and (c) amplitude information comprising, for each $j \in \{1,2,\ldots,N\}$, a representation of a complex number $A_j[x_j|x_{k_1}, x_{k_2}, \ldots, x_{k_{|S_j|}}]$ for each vector $(x_j, x_{k_1}, x_{k_2}, \ldots, x_{k_{|S_j|}})$ such that $x_j \in \Sigma_j$, $x_{k_1} \in \Sigma_{k_1}$, $x_{k_2} \in \Sigma_{k_2}, \ldots,$ and $x_{k_{|S_j|}} \in \Sigma_{k_{|S_j|}}$, wherein $(\hat{x}_{k_1}, \hat{x}_{k_2}, \ldots, \hat{x}_{k_{|S_j|}})$ are the $|S_j|$ nodes connected to $\hat{x}_j$ by directed lines entering $\hat{x}_j$, wherein said directed lines entering $\hat{x}_j$ transmit the state of their source node, wherein said $|S_j|$ is an integer greater or equal to zero;

calculating with said calculation means and with some parts of said knowledge base, the probability that some said node $\hat{x}_j$ will be measured to be in a state $x_j$ contained in $\Sigma_j$.

\* \* \* \* \*

UNITED STATES PATENT AND TRADEMARK OFFICE
CERTIFICATE OF CORRECTION

PATENT NO. : 5,787,236
DATED : July 28, 1998
INVENTOR(S) : Robert R. Tucci

It is certified that error appears in the above-identified patent and that said Letters Patent is hereby corrected as shown below:

Column 2, line 27: Replace "paper bay B.Yurke" by "paper by B.Yurke".

Column 3, line 4: Replace "node may, assume" by "node may assume".

Column 5, line 1: Replace "lie in state $\hat{x}_j$," by "lie in state $x_j$,".
Column 5, line 2: Replace "lie in state $\hat{x}_j$," by "lie in state $x_j$,".
Column 5, line 13: Replace "$A_1[x_1]$ t node" by "$A_1[x_1]$ to node".
Column 5, line 21: Replace "net story call it" by "net story, call it".
Column 6, line 17: Replace "active states the evidence" by "active states, the evidence".
Column 6, line 28: Replace "functional $_x[K]$" by "functional $\chi[K]$".
Column 6, line 40: Replace "the law of Quantum Mechanics" by "the laws of Quantum Mechanics".

UNITED STATES PATENT AND TRADEMARK OFFICE
CERTIFICATE OF CORRECTION

PATENT NO. : 5,787,236
DATED : July 28, 1998
INVENTOR(S) : Robert R. Tucci

It is certified that error appears in the above-identified patent and that said Letters Patent is hereby corrected as shown below:

Column 7, line 66: Replace "Mian Window" by "Main Window".
Column 8, line 29: Replace "list be selecting" by "list by selecting".
Column 9, line 13: Replace "state the 2" by "state, the 2".
Column 10, line 35: Replace "many, modifications" by "many modifications".
Column 10, line 55: Replace "and era arrows" by "and any arrows".
Column 11, line 9: Replace "been (calling" by "been calling".
Column 13, line 24: Replace "vector and" by "vector $(x_j, x_{k_1}, x_{k_2}, \cdots, x_{k_{|S_j|}})$ such that $x_j \in \Sigma_j$, $x_{k_1} \in \Sigma_{k_1}$, $x_{k_2} \in \Sigma_{k_2}$, $\cdots$, and"

Signed and Sealed this

Fifth Day of January, 1999

Attest:

Attesting Officer

*Acting Commissioner of Patents and Trademarks*